No. 809,708. PATENTED JAN. 9, 1906.
A. LIPSCHUTZ.
JOURNAL BEARING.
APPLICATION FILED JUNE 17, 1905.
2 SHEETS—SHEET 1.
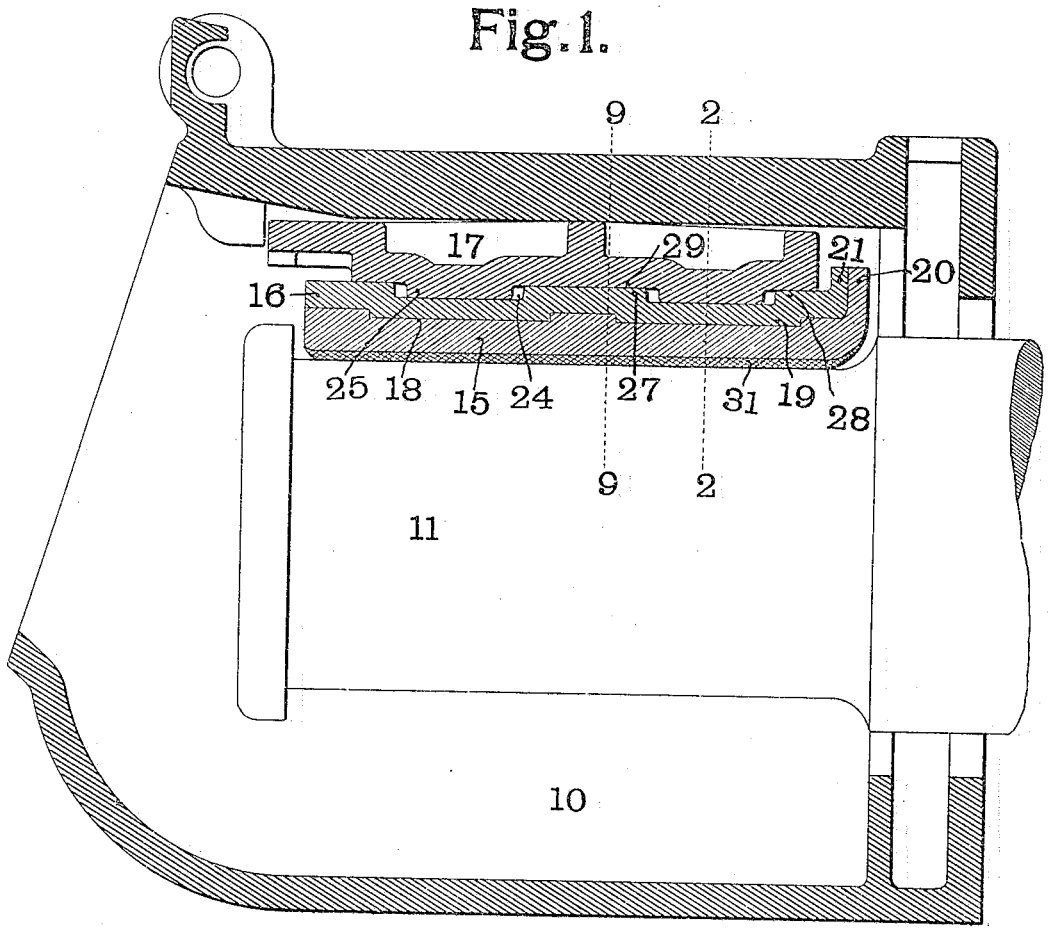
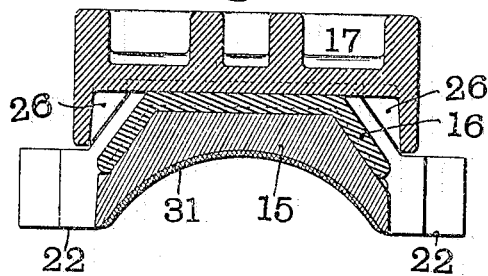
WITNESSES:
W. H. Alexander.
Fred C. Henke.
INVENTOR
A. Lipschutz.
BY
Fowler & Bryson
ATTORNEYS No. 809,708. PATENTED JAN. 9, 1906.
A. LIPSCHUTZ.
JOURNAL BEARING.
APPLICATION FILED JUNE 17, 1905.
2 SHEETS—SHEET 2.
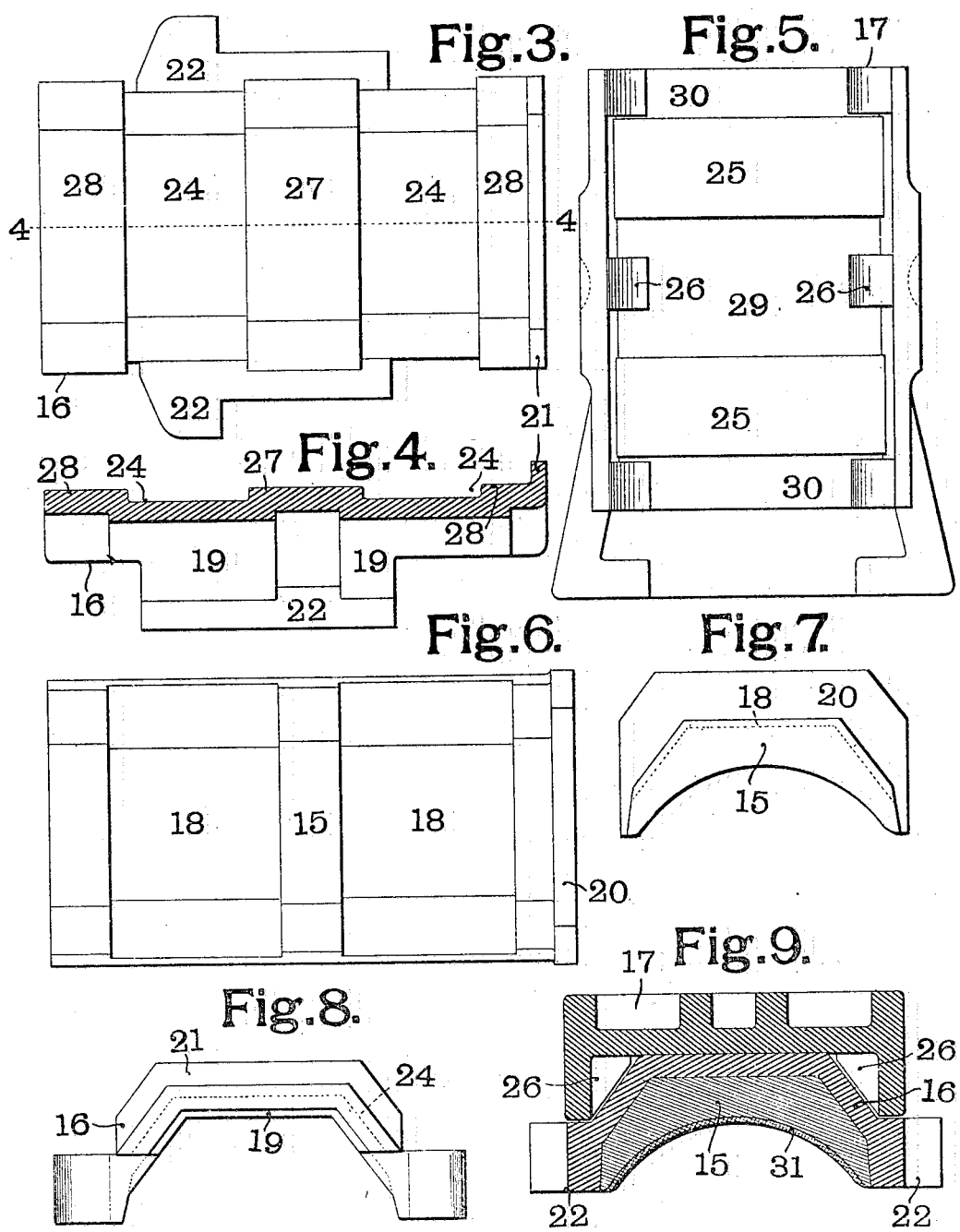
WITNESSES:
W. H. Alexander.
Fred C. Henke.
INVENTOR
A. Lipschutz.
BY
Fowler & Bryson
ATTORNEYS

UNITED STATES PATENT OFFICE.

ARTHUR LIPSCHUTZ, OF ST. LOUIS, MISSOURI.

JOURNAL-BEARING.

No. 809,708. Specification of Letters Patent. Patented Jan. 9, 1906.

Application filed June 17, 1905. Serial No. 265,727.

*To all whom it may concern:*

Be it known that I, ARTHUR LIPSCHUTZ, a citizen of the United States, residing at the city of St. Louis, State of Missouri, have invented a certain new and useful Improvement in Journal-Bearings, of which the following is such a full, clear, and exact description as will enable any one skilled in the art to which it appertains to make and use the same, reference being had to the accompanying drawings, forming part of this specification.

My invention relates to journal-bearings, and more particularly to that class of bearings which are used for the axles of railway-cars and which consist of two parts—a brass and a key or wedge, the brass bearing upon the journal of the axle and the wedge being interposed between the journal-box and the brass.

One object of my invention is to economize the bearing metal of the brass.

Another object of my invention is to provide for longitudinal movement between the brass and the wedge or key; and still another object of my invention is to so construct the brass and the wedge that either may be replaced by the standard type of Master Car-Builders' brass or wedge.

In the accompanying drawings, which illustrate one form of bearing made in accordance with my invention, Figure 1 is a vertical central section showing my bearing applied in the bearing-box of a car. Fig. 2 is a section through the brass and wedge, taken on the line 2 2 of Fig. 1. Fig. 3 is a top plan view of the upper part or shell of the brass. Fig. 4 is a section on the line 4 4 of Fig. 3. Fig. 5 is a bottom plan view of the wedge. Fig. 6 is a top plan view of the lower part or body of the brass. Fig. 7 is an end view of the body of the brass. Fig. 8 is an end view of the upper part or shell of the brass; and Fig. 9 is a section through the brass and wedge, taken on the line 9 9 of Fig. 1.

Like marks of reference refer to similar parts in the several views of the drawings.

10 represents the journal-box, and 11 the axle. These may be of any suitable form. As shown in Fig. 1 of the drawings, they are of the standard Master Car-Builders' type. The bearing consists of two parts—a brass and a wedge, and the brass itself is preferably composed of two parts, as shown in the drawings—namely, a lower or body portion 15, of any suitable bearing metal, and a top or shell part 16, preferably formed of malleable iron.

The wedge 17 is also preferably formed of malleable iron and is interposed between the brass and the journal-box 10, as shown in Fig. 1 of the drawings. The body part 15 of the brass is provided with two depressions 18, which extend across the upper face of the said part 15, as best shown in Fig. 6 of the drawings. The shell 16 is provided on its under face with projections 19, which correspond with the depressions 18 in the body and which fit snugly in said depressions, so as to prevent longitudinal movement between the body and the shell. The body 15 is also preferably provided at its inner end with an apron 20, which bears against an upturned portion 21 on the inner end of the shell 16, and thus helps to prevent movement between the two parts of the brass. The shell 16 is provided at each side with a retaining-lug 22 of the usual form for retaining the brass in position in the bearing-box. These lugs 22 extend down so that they are substantially flush with the lower edges of the body 15, as is best seen in Fig. 9. At each end of the lug 22, however, the shell 16 is of less depth than the body 15, as is shown in Fig. 4, so that when the two parts are assembled the body 15 projects below the shell 16 at each end, as is shown in Fig. 2 of the drawings, which is a section beyond one end of the lugs 22. The upper face of the shell 16 is provided with a pair of depressed bearings 24, and the lower face of the wedge 17 is provided with projecting bearings 25, which coöperate with the depressed bearings 24. The projecting bearings 25, however, are of less width than the depressed bearings 24, so that the brass and the key or wedge are capable of longitudinal movement with respect to each other, as is best seen in Fig. 1 of the drawings. The wedge or key is also made of slightly greater width than the brass, so as to allow of slight lateral movement between the parts in the usual manner. This lateral movement is limited by means of wedge-shaped stops 26 on the wedge or key 17. Between the two depressed bearings 24 is a raised surface 27, and at each end of the shell 16 are other raised surfaces 28. These surfaces 27 and 28 contact with surfaces 29 and 30, respectively, on the under face of the wedge. The body 15 of the brass may be coated in the usual manner with a soft-metal lining 31.

It will be evident that while securing a good bearing between the brass and the wedge my construction allows of considerable longitudinal movement between the two parts, and it will also be evident that should either part become broken it can be replaced by the standard type of flat key or wedge. In case the wedge should become broken the standard type of key could be used and would rest upon the surfaces 27 and 28, thus giving a good bearing, and if the brass should be broken a standard type of brass could be used and the surfaces 25 of the wedge would rest upon the top of the standard type of brass, thus also giving a good bearing-surface. On account of the construction of the brass the minimum amount of bearing metal is used, and at the same time substantially the same effect is obtained as in a solid brass formed entirely of bearing metal.

Having fully described my invention, what I claim as new, and desire to secure by Letters Patent of the United States, is—

1. The combination with a journal-box, of a brass having a plurality of depressed flat bearings extending across its upper face, and a wedge interposed between said journal-box and brass and having on its under face projecting bearings coöperating with the depressed bearings on said brass.

2. The combination with a journal-box, of a brass having a depressed flat bearing extending across its upper face, and a wedge interposed between said journal-box and brass and having a projecting bearing coöperating with the depressed bearing on said brass, said projecting bearing being of sufficiently less width than said depressed bearing to permit end play between said bearings.

3. The combination with a journal-box, of a brass, said brass having a plurality of depressed flat bearings extending across its upper face, and a wedge interposed between said journal-box and brass and having projecting bearings coöperating with the depressed bearings of said brass, said projecting bearings being of sufficiently less width than said depressed bearings to permit end play between said bearings.

4. The combination with a journal-box, of a brass having a plurality of depressed flat bearings extending across its upper face, a wedge interposed between said journal-box and brass, and having on its lower face projecting bearings coöperating with the depressed bearings on said brass, and lugs carried by said wedge between the projecting bearings thereon for limiting lateral movement of said brass.

In testimony whereof I have hereunto set my hand and affixed my seal in the presence of the two subscribing witnesses.

ARTHUR LIPSCHUTZ. [L. S.]

Witnesses:
W. A. ALEXANDER,
A. C. FOWLER.